(12) United States Patent
Stapleton et al.

(10) Patent No.: US 10,301,960 B2
(45) Date of Patent: May 28, 2019

(54) SHROUD ASSEMBLY FOR GAS TURBINE ENGINE

(71) Applicant: General Electric Company, Schenectady, NY (US)

(72) Inventors: David Scott Stapleton, Boston, MA (US); Bryce Loring Heitman, Cincinnati, OH (US); Laura Isabelle Armanios, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1133 days.

(21) Appl. No.: 14/797,240

(22) Filed: Jul. 13, 2015

(65) Prior Publication Data

US 2017/0016341 A1    Jan. 19, 2017

(51) Int. Cl.
*F01D 11/18*    (2006.01)
*F01D 11/08*    (2006.01)
(Continued)

(52) U.S. Cl.
CPC ............... *F01D 11/08* (2013.01); *F01D 9/04* (2013.01); *F01D 9/042* (2013.01); *F01D 25/005* (2013.01);
(Continued)

(58) Field of Classification Search
CPC ........ F01D 11/18; F01D 11/08; F01D 25/246; F01D 25/243
See application file for complete search history.

(56) References Cited

U.S. PATENT DOCUMENTS

| 5,330,321 A | 7/1994 | Roberts et al. |
| 5,459,995 A | 10/1995 | Norton et al. |

(Continued)

FOREIGN PATENT DOCUMENTS

| JP | 2011-247262 A | 12/2011 |
| JP | 2012-509435 A | 4/2012 |

(Continued)

OTHER PUBLICATIONS

Extended European Search Report and Opinion issued in connection with corresponding EP Application No. 16178852.6 dated Dec. 6, 2016.

(Continued)

*Primary Examiner* — Jason Shanske
*Assistant Examiner* — Behnoush Haghighian
(74) *Attorney, Agent, or Firm* — General Electric Company; William Andes

(57) ABSTRACT

Shroud assemblies for gas turbine engines are provided. A shroud assembly includes a hanger having a forward hanger arm, a rear hanger arm, and a hanger body extending between the forward hanger arm and the rear hanger arm. The shroud assembly further includes a shroud having a forward surface, a rear surface, and an inner surface and outer surface extending between the forward surface and the rear surface, the outer surface radially spaced from the inner surface, the shroud connected to the hanger. The shroud assembly further includes a support member positioned axially forward of the forward hanger arm, the support member having a radially outer portion connected to the forward hanger arm and a radially inner portion axially spaced from the shroud such that a gap is defined between the radially inner portion and an axially adjacent surface of the shroud.

18 Claims, 7 Drawing Sheets

(51) Int. Cl.
  *F01D 9/04* (2006.01)
  *F01D 25/24* (2006.01)
  *F01D 25/00* (2006.01)
  *F02C 3/04* (2006.01)

(52) U.S. Cl.
  CPC .............. *F01D 25/246* (2013.01); *F02C 3/04* (2013.01); *F01D 11/18* (2013.01); *F05D 2220/32* (2013.01); *F05D 2240/11* (2013.01); *F05D 2240/128* (2013.01); *F05D 2240/35* (2013.01); *F05D 2260/30* (2013.01); *F05D 2260/31* (2013.01); *F05D 2300/10* (2013.01); *F05D 2300/6033* (2013.01); *Y02T 50/672* (2013.01)

(56) References Cited

U.S. PATENT DOCUMENTS

| | | | |
|---|---|---|---|
| 5,593,277 | A | 1/1997 | Proctor et al. |
| 2004/0071548 | A1 | 4/2004 | Wilson, Jr. |
| 2014/0223920 | A1 | 8/2014 | Stevens et al. |
| 2014/0271147 | A1* | 9/2014 | Uskert .................. F01D 11/24 415/173.2 |

FOREIGN PATENT DOCUMENTS

| | | |
|---|---|---|
| JP | 2012-097732 A | 5/2012 |
| JP | 2015-515579 A | 5/2015 |

OTHER PUBLICATIONS

Office Action issued in connection with corresponding CA Application No. 2935350 dated Apr. 24, 2017.

First Office Action and Search issued in connection with corresponding CN Application No. 201610548814.8 dated May 12, 2017.

Search Report issued in connection with corresponding JP Application No. 2016-136484 dated Jun. 8, 2017.

Notification of Reasons for Refusal issued in connection with corresponding JP Application No. 2016-136484 dated Jul. 4, 2017.

* cited by examiner

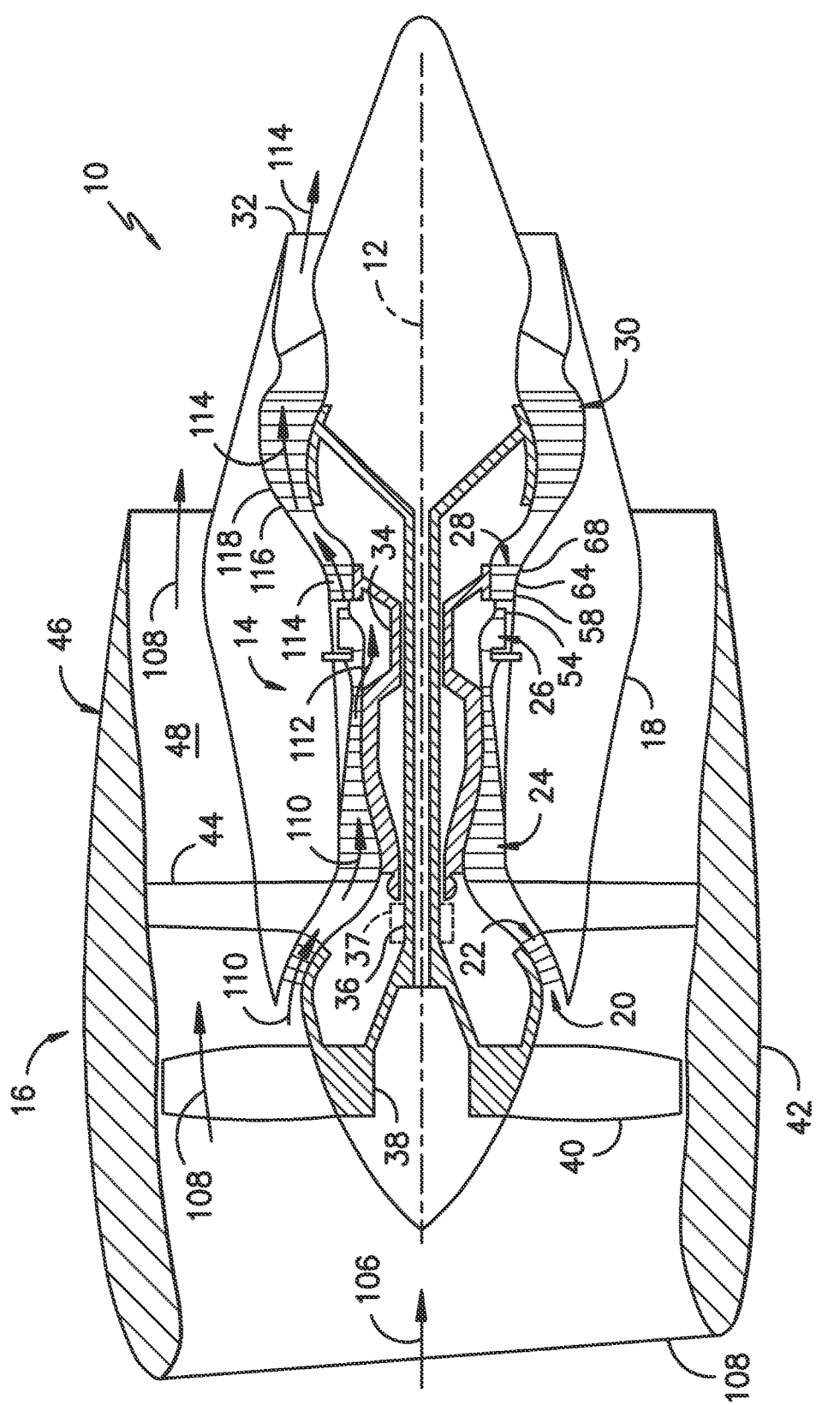
FIG. -1-

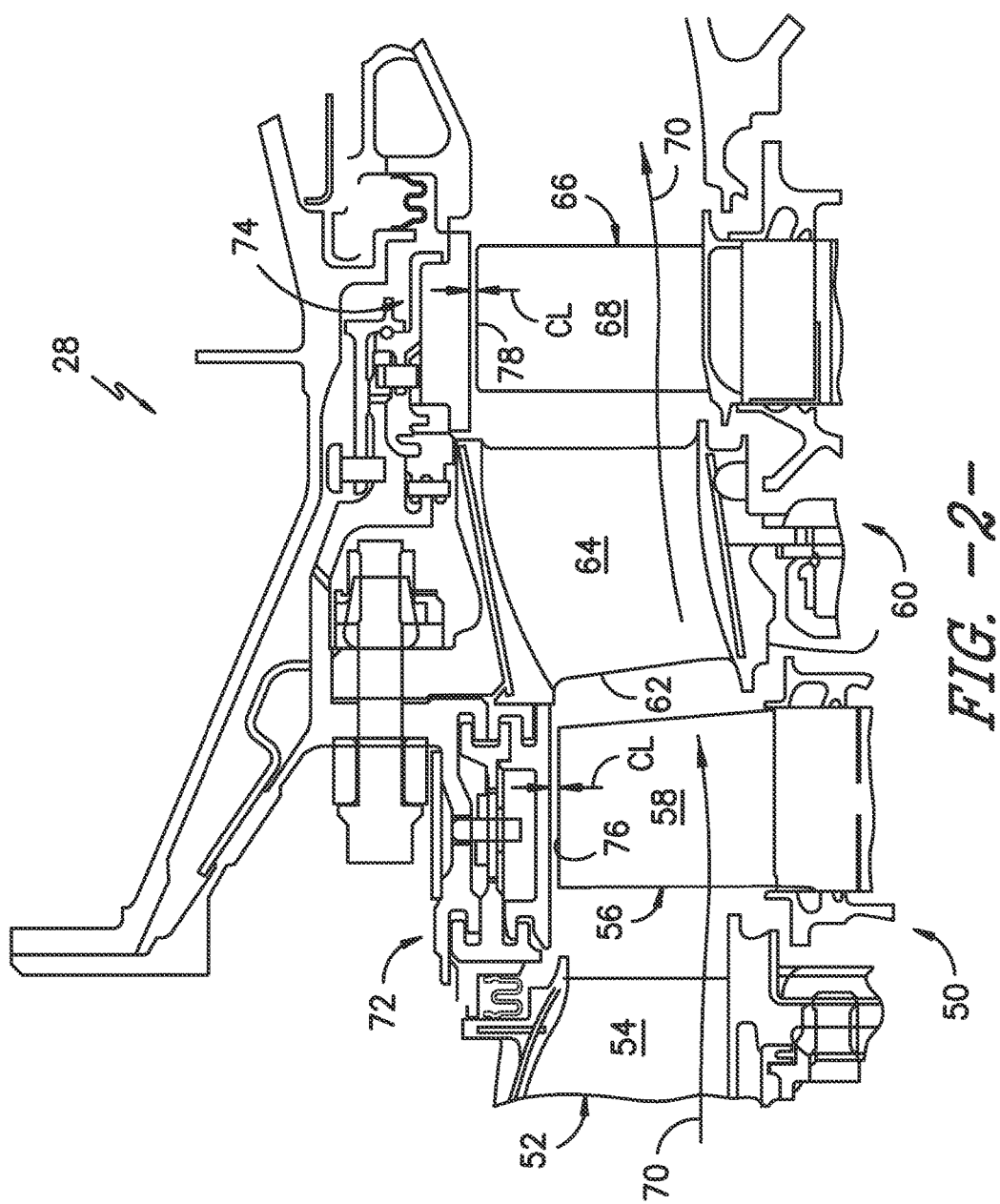
FIG. -2-

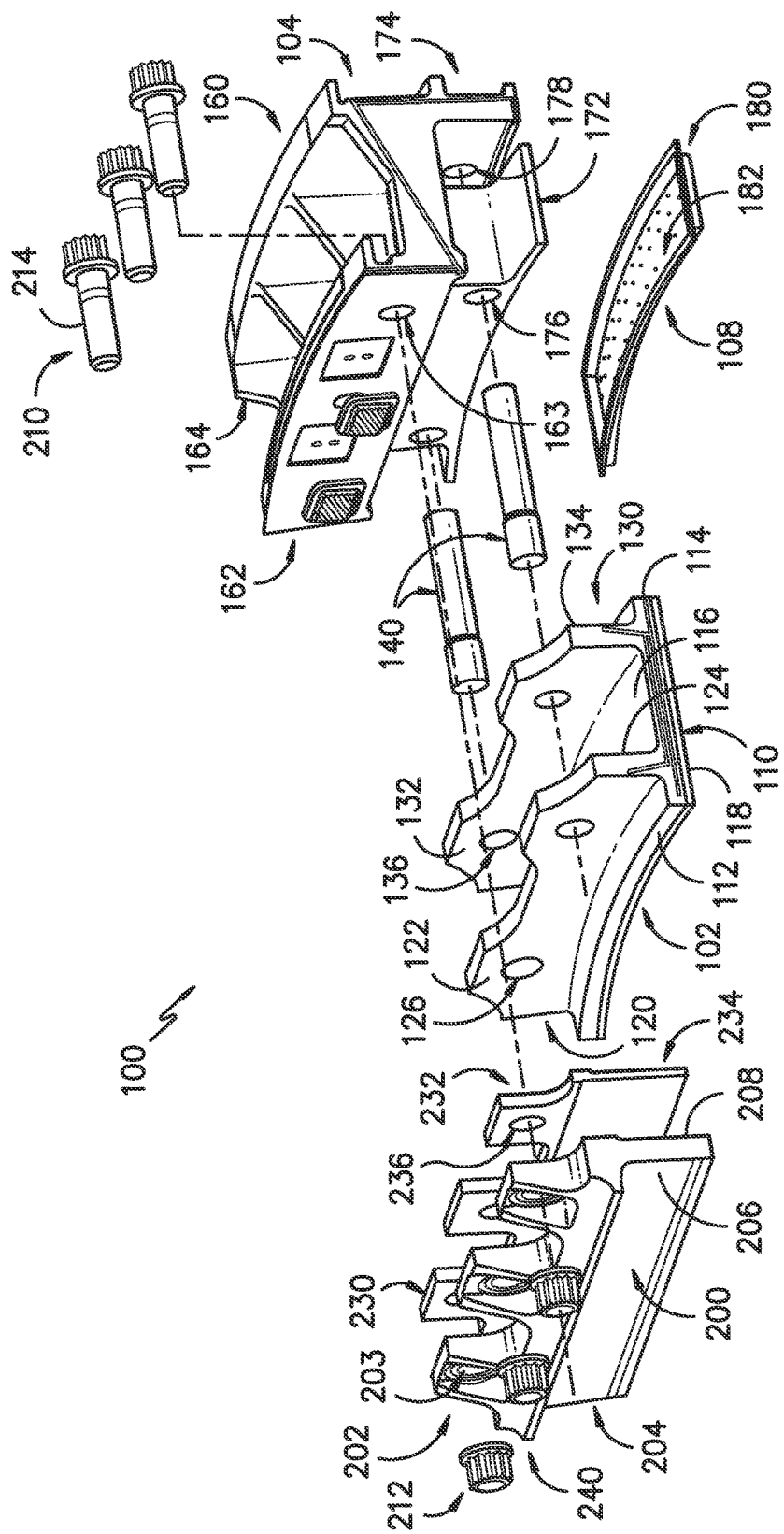
FIG. -3-

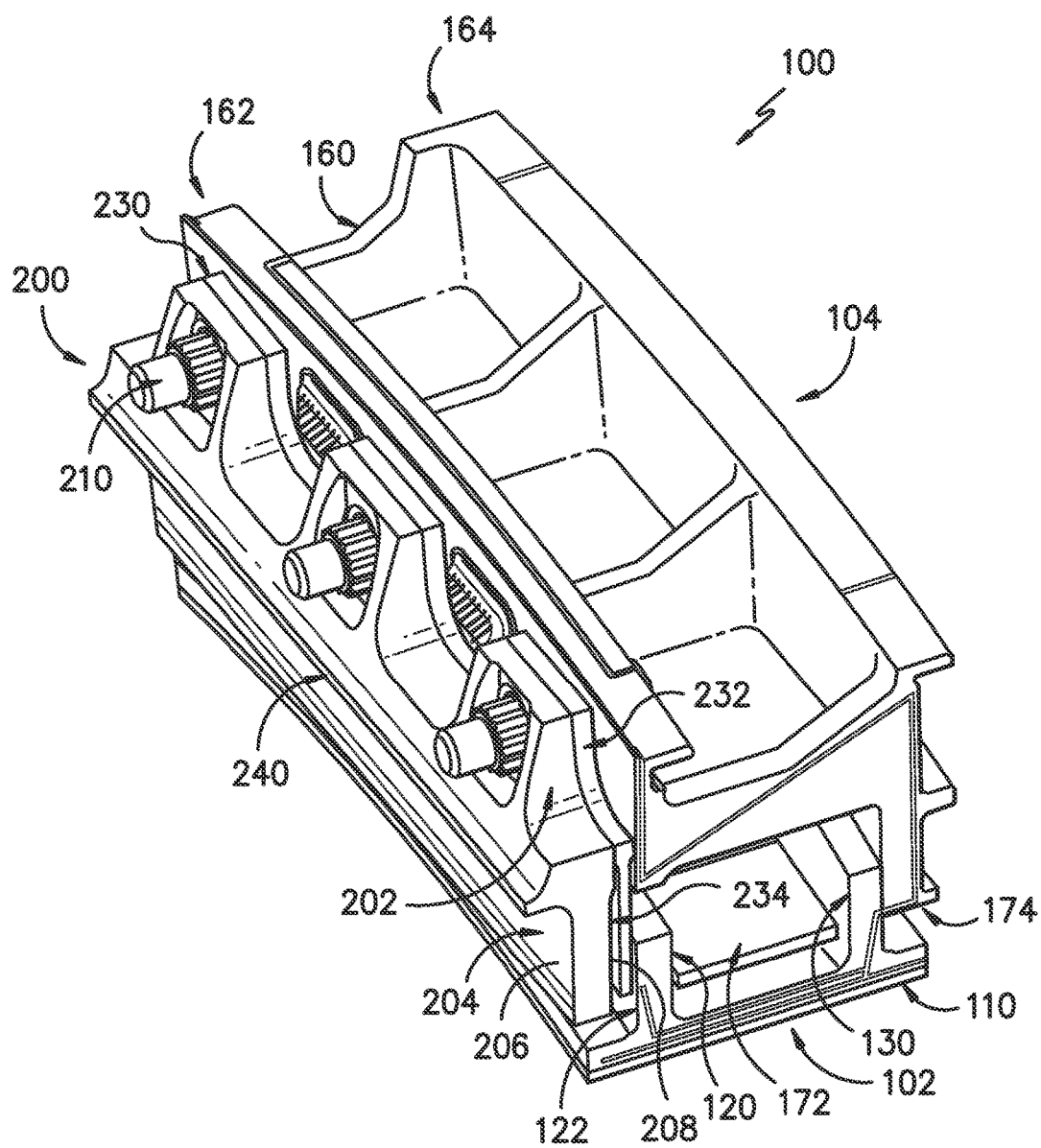
FIG. -4-

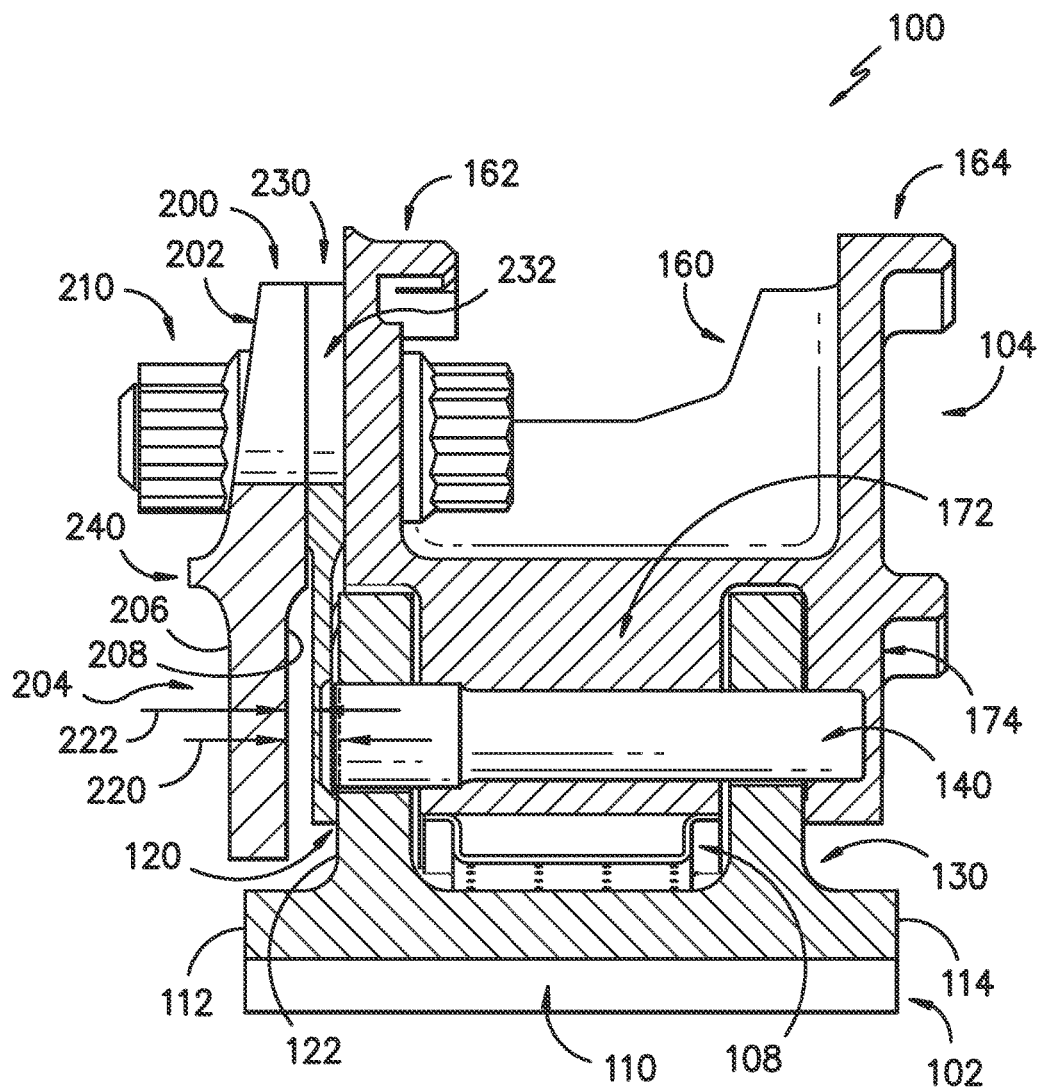
FIG. -5-

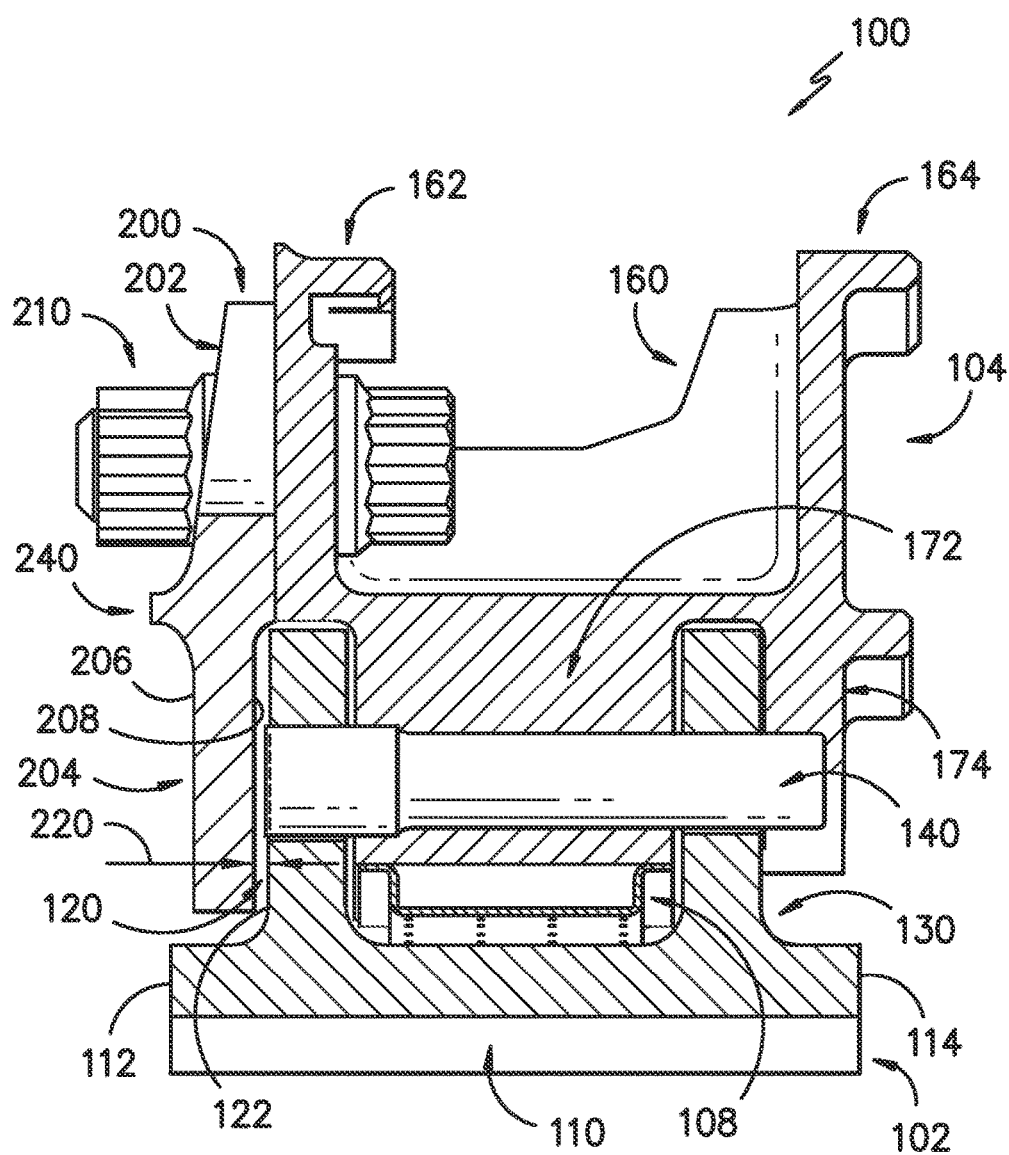
FIG. -6-

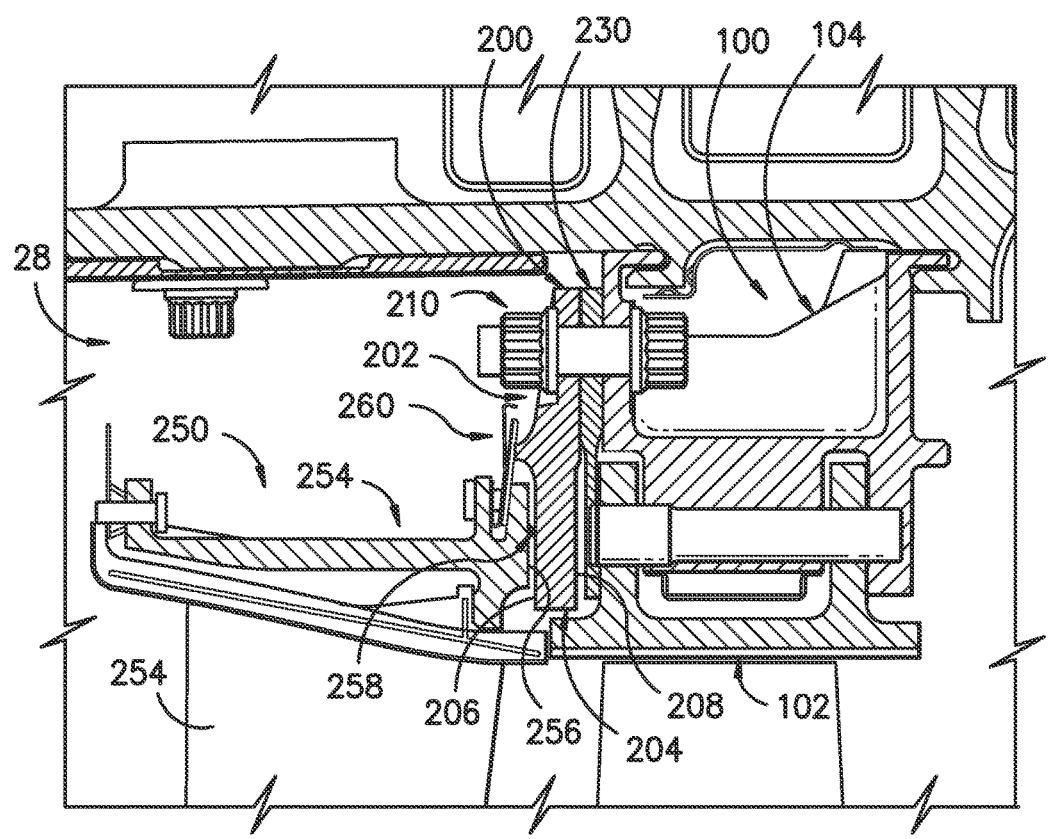
FIG. -7-

SHROUD ASSEMBLY FOR GAS TURBINE ENGINE

FIELD OF THE INVENTION

The present subject matter relates generally to shroud assemblies for gas turbine engines. More particularly, the present subject matter relates to shroud assemblies having improved features for directing loads therethrough.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

In general, the HP turbine and LP turbine may additionally include shroud assemblies which further define the hot gas path. A clearance gap may be defined between the shroud of a shroud assembly and the rotatable turbine components of an associated stage of rotatable turbine components. The shroud is typically retained within the gas turbine engine by a shroud hanger, which in turn is coupled to various other components of the engine. Further, in many cases, nozzles positioned axially forward of a shroud assembly may contact the shroud assembly to define and generally seal the hot gas path.

One issue with many known gas turbine engine designs is load transmission between various adjacent components in various sections of the gas turbine engine. For example, nozzle loads may be transmitted through shroud assemblies into the casing of the gas turbine engine. However, in many cases, it is undesirable for components of shroud assemblies, such as the shrouds themselves, to experience these loads. For example, ceramic matrix composite shrouds, while providing numerous advantages when utilized in gas turbine engines, are generally undesirable for such load transmission due to the characteristics of the ceramic matrix composite material.

One known solution to this load transmission issue is to include an outer support connected to the casing and in contact with the nozzles. Seals are provided between the support and the hanger of the adjacent shroud assemblies. Loads are thus transmitted through the support from the nozzles to the hangers of the shroud assemblies. However, thermal gradients experienced by these supports during operation, and resulting axial deflection of the supports, causes large variations in nozzle-shroud axial gaps. Additional purge flow is thus required to compensate for the potential increases in these axial gap sizes, thus reducing the amount of working fluid utilized for combustion and reducing the efficiency of the engine. Additionally, these supports are generally heavy and expensive parts, thus undesirably increasing the cost and weight of the gas turbine engine.

Accordingly, improved shroud assemblies for use in gas turbine engines are desired. In particular, shroud assemblies having improved load transmission features would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a shroud assembly for a gas turbine engine is provided. The shroud assembly includes a hanger, the hanger having a forward hanger arm, a rear hanger arm axially spaced from the forward hanger arm, and a hanger body extending between the forward hanger arm and the rear hanger arm. The shroud assembly further includes a shroud, the shroud having a forward surface, a rear surface axially spaced from the forward surface, an inner surface extending between the forward surface and the rear surface, and an outer surface extending between the forward surface and the rear surface and radially spaced from the inner surface, the shroud connected to the hanger. The shroud assembly further includes a support member positioned axially forward of the forward hanger arm, the support member having a radially outer portion connected to the forward hanger arm and a radially inner portion axially spaced from the shroud such that a gap is defined between the radially inner portion and an axially adjacent surface of the shroud.

In accordance with another embodiment of the present disclosure, a turbine section of a gas turbine engine is provided. The turbine section includes a shroud assembly. The shroud assembly includes a hanger, the hanger having a forward hanger arm, a rear hanger arm axially spaced from the forward hanger arm, and a hanger body extending between the forward hanger arm and the rear hanger arm. The shroud assembly further includes a shroud, the shroud having a forward surface, a rear surface axially spaced from the forward surface, an inner surface extending between the forward surface and the rear surface, and an outer surface extending between the forward surface and the rear surface and radially spaced from the inner surface, the shroud connected to the hanger. The shroud assembly further includes a support member positioned axially forward of the forward hanger arm, the support member having a radially outer portion connected to the forward hanger arm and a radially inner portion axially spaced from the shroud such that a gap is defined between the radially inner portion and an axially adjacent surface of the shroud. The turbine section further includes a nozzle assembly positioned axially forward of the shroud assembly. The nozzle assembly includes an airfoil, and an outer band positioned radially outward of the airfoil. The outer band includes a rear surface, the rear surface in contact with the radially inner portion of the support member of the shroud assembly.

In accordance with another embodiment of the present disclosure, a gas turbine engine is provided. The gas turbine engine includes a compressor section, a combustion section, and a turbine section. The gas turbine engine further includes a shroud assembly disposed in one of the compressor section or the turbine section. The shroud assembly includes a hanger, the hanger having a forward hanger arm, a rear hanger arm axially spaced from the forward hanger arm, and a hanger body extending between the forward hanger arm and the rear hanger arm. The shroud assembly further includes a shroud, the shroud having a forward surface, a rear surface axially spaced from the forward surface, an inner surface extending between the forward surface and the rear surface, and an outer surface extending between the forward surface and the rear surface and radially spaced from the inner surface, the shroud connected to the hanger. The shroud assembly further includes a support member positioned axially forward of the forward hanger arm, the support member having a radially outer portion connected to the forward hanger arm and a radially inner portion axially spaced from the shroud such that a gap is defined between the radially inner portion and an axially adjacent surface of the shroud.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic cross-sectional view of a gas turbine engine in accordance with one embodiment of the present disclosure;

FIG. 2 is an enlarged cross sectional side view of a high pressure turbine section of a gas turbine engine in accordance with one embodiment of the present disclosure;

FIG. 3 is an exploded perspective view of a shroud assembly in accordance with one embodiment of the present disclosure;

FIG. 4 is an assembled perspective view of a shroud assembly in accordance with one embodiment of the present disclosure;

FIG. 5 is a cross-sectional view of a shroud assembly in accordance with one embodiment of the present disclosure;

FIG. 6 is a cross-sectional view of a shroud assembly in accordance with another embodiment of the present disclosure; and FIG. 7 is a cross-sectional view of a portion of a turbine section of a gas turbine engine in accordance with one embodiment of the present disclosure.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines 28, and rather may be utilized in any suitable section of a gas turbine engine.

Referring now to FIGS. 3 through 7, improved shroud assemblies 100 are disclosed. Shroud assemblies 100 as disclosed herein may be utilized in place of shroud assemblies 72, 74, as discussed above, or any other suitable shroud assemblies in an engine 10.

Shroud assemblies in accordance with the present disclosure provide a number of advantages. In particular, shroud assemblies 100 include features which advantageously facilitate load transmission from axially forward nozzles through the hangers of the shroud assemblies 100 to the casing of the gas turbine engine 10, while reducing or eliminating load transmission through the shrouds of such shroud assemblies. This is particularly desirable in embodiments wherein the shrouds are formed from ceramic matrix composite ("CMC") materials. Further, the use of shroud assemblies in accordance with the present disclosure reduces undesirable issues associated with previously known load transmission components, such as large nozzle-shroud axial gap variations and resulting increases in purge flow, as well as associated weight and cost issues. Accordingly, the gas turbine engine efficiency is increased, weight is reduced, and cost is reduced.

FIGS. 3 through 7 illustrate embodiments of a shroud assembly 100 in accordance with the present disclosure. Shroud assembly 100 includes a shroud 102 and a hanger 104. A shroud 102 in accordance with the present disclosure may include, for example, a shroud body 110, a forward flange 120, and a rear flange 130. In exemplary embodiments, the shroud body 110 and flanges 120, 130 (and shroud 102 in general) may be formed from a CMC material, although in alternative embodiments the shroud body 110 and flanges 120, 130 (and shroud 102 in general) may be formed from another suitable material such as a metal, etc. In particular, in exemplary embodiments, shroud body 110 and flanges 120, 130 may be integral and thus generally formed as a single component.

Shroud body 110 may include a forward surface 112 and a rear surface 114. The rear surface 114 is axially spaced from the forward surface 112, such as generally along the centerline 12 when in the engine 10. An inner surface 116 and an outer surface 118 may each extend between the forward surface 112 and the rear surface 114. The outer surface 118 is radially spaced from the inner surface 116. Inner surface 116 may, when the shroud 102 is in engine 10, be exposed to the hot gas path 70, while outer surface 118 is thus radially spaced from the hot gas path 70.

Forward flange 120 and rear flange 130 may each extend from the shroud body 110, such as from the outer surface 118 thereof. Rear flange 130 may be axially spaced from forward flange 120. Further, forward flange 120 may be generally positioned proximate the forward surface 112 of the body 110, while rear flange 130 is generally positioned proximate the rear surface 114 of the body 110. Each flange 120, 130 may include a forward surface 122, 132 (respectively) and a rear surface 124, 134 respectively. As shown, the flanges 120, 130 may each extend generally circumferentially along their lengths, and thus be circumferentially oriented.

Further, one or more bore holes 126, 136 may be defined in each flange 120, 130, respectively. Each bore hole 126, 136 may, for example, extend generally axially through the associated flange 120, 130 between the associated forward surface 122, 132 and associated rear surface 124, 134. The bore holes 126, 136 are generally utilized for connecting the shroud 102 to the hanger 104. For example, pins 140 may be inserted into the bore holes 126, 136 and associated bore holes of the hanger 104 to connect the shroud 102 to the hanger 104.

Hanger 104 generally is connected to and supports the shroud 102 in the engine 10, and is itself supported by various other components in the engine 10. Hanger 104 may include a hanger body 160, and a forward hanger arm 162 and rear hanger arm 164 extending from the hanger body 160, such as radially outward (away from hot gas path 70) from the hanger body 160. Hanger body 160 may thus extend between the arms 162, 164. The rear arm 164 may be axially spaced from the forward arm 162, as shown.

Hanger 104 may further include one or more flanges extending from the hanger body 160, such as radially inward (towards hot gas path 70) from the hanger body 160. For example, a forward flange 172 and a rear flange 174 may extend from the hanger body 160. Rear flange 174 may be axially spaced from forward flange 172. Forward flange 172 may be proximate forward hanger arm 162 and rear flange 174 may be proximate rear hanger arm 164. One or more bore holes 176, 178 may be defined in the flanges 172, 174, respectively.

When assembled, the bore holes 126, 136 of the shroud flanges 120, 130 may generally align with the associated hanger bore holes 176, 178. For example, bore holes 126 may align with bore holes 176, and bore holes 136 may align with bore holes 178. One or more pins 140 may be inserted through and thus extend through the associated bore holes to couple the hanger 104 and shroud 102 together. In some embodiments as shown, a pin 140 may extend through aligned bore holes 126, 176, 136 and 178. Alternatively, separate pins 140 may be utilized for aligned bore holes 126, 176 and aligned bore holes 136, 178. Accordingly, forward flange 120 and rear flange 130 may be coupled to forward flange 172 and rear flange 174.

In exemplary embodiments, the hanger body 160, forward hanger arm 162, rear hanger arm 162, forward flange 172 and rear flange 174 (and hanger 104 in general) may be formed from a metal material, although in alternative embodiments the hanger body 160, forward hanger arm 162, rear hanger arm 162, forward flange 172 and rear flange 174 (and hanger 104 in general) may be formed from another suitable material.

As shown, shroud assembly 100 may further include a baffle 108. Baffle 108 may be disposed radially between the hanger 104 and the shroud 102 of a shroud assembly 100. Baffle 108 may include a body 180 which defines a plurality of cooling holes 182 for routing fluid therethrough, such as for cooling purposes. In exemplary embodiments, the baffle is formed from a metal material, although in alternative embodiments the baffle 108 may be formed from another suitable material.

Referring still to FIGS. 3 through 7, shroud assembly 100 may further include a support member 200 which is positioned axially forward of the forward hanger arm 162. The support member 200 may advantageously be positioned and configured to transfer loads from one or more nozzle assemblies 250 through the shroud assembly 100 to the support structure to which the hanger 104 of the shroud assembly 100 is coupled. In particular, support member 200 may, as discussed above, transfer loads from these nozzle assemblies 250 through hanger 104 with minimal or no loads transmitted to the shroud 102.

Referring briefly to FIG. 7, a nozzle assembly 250 may be positioned axially forward of a shroud assembly 100, and may for example be a component of a neighboring nozzle array in a particular stage in a turbine section or compressor section of gas turbine engine 10. For example, nozzle assembly 250 may be included in array 52 of first stage 40 or array 62 of second stage 60, with shroud assembly 100 being utilized in place of shroud assembly 72 or shroud assembly 74, respectively (see FIG. 2). Nozzle assembly 250 may include an airfoil 252 and an outer band 254 positioned radially outward of the airfoil 252. Outer band 254 may, for example, be the outer band of the nozzle itself, or may be the outer band of a support structure (which may be include a strut extending through the nozzle) utilized with the nozzle of a nozzle assembly 250. The outer band 254 may include a rear surface 256 which, when assembled, may be in contact (either directly or indirectly through a suitable seal 258) with the support member 200. Specifically, the rear surface 256 may contact a radially inner portion of the support member 200. Accordingly, loads may be transmitted from the nozzle assembly 250 through rear surface 256 to the support member 200, and as discussed from support member 200 to hanger 104 with minimal or no load transmission to the shroud 102.

Referring again to FIGS. 3 through 7, support member 200 is in exemplary embodiments formed from a metal material, although in alternative embodiments support member 200 may be formed from any suitable material. Support member 200 may include a radially outer portion 202 and a radially inner portion 204, and may further have a forward surface 206 and an aft surface 208.

The radially outer portion 202 of support member 200 may be connected to the forward hanger arm 162. In exemplary embodiments, one or more mechanical fasteners 210 may connect the radially outer portion 202 and the forward hanger arm 162. For example, one or more bore holes 163 may be defined in forward hanger arm 162, and one or more mating bore holes 203 may be defined in outer portion 202. A mechanical fastener may extend through each aligned bore hole 163 and mating bore hole 203 to connect the radially outer portion 202 and forward hanger arm 162. In exemplary embodiments as illustrated, mechanical fasteners 210 may each include a nut 212 and mating bolt 214, as illustrated. Alternatively, other suitable mechanical fasteners, such as screws, nails, rivets, etc., may be utilized.

In exemplary embodiments, the mechanical fasteners 210 are formed from a metal material, although in alternative embodiments the fasteners 210 may be formed from another suitable material.

Radially inner portion 204 may, as shown, be axially spaced from the shroud 102, such as from the forward surface 122 of the forward flange 120. An axial gap 220 is thus defined between the radially inner portion 204 and an axially adjacent surface of the shroud 102, such as forward surface 122. This gap 220 is advantageously sized to prevent contact between the support member 200 and the shroud 102, thus reducing or eliminating load transmission between the support member 200 and shroud 102. Loads instead may advantageously be transmitted through the radially outer portion 202 and through the connection between the radially outer portion 202 and forward hanger arm 162, such as through the mechanical fasteners 210.

In some embodiments, as illustrated in FIG. 6, the radially outer portion 202 of support member 200 contacts the forward hanger arm 162 when the shroud assembly 100 is assembled. In other embodiments, as illustrated in FIGS. 3 through 5 and 7, a hanger plate 230 may be disposed between the support member 200 and the forward hanger arm 162. Hanger plate 230 may be in contact with the radially outer portion 202 and the forward hanger arm 162, as illustrated.

Hanger plate 230 may generally further protect the shroud 102 from contact with the support member 200, such as with the radially inner portion 204 thereof. As shown, hanger plate 230 may be connected to and between the radially outer portion 202 and the forward hanger arm 162. For example, hanger plate 230 may include a radially outer portion 232 and a radially inner portion 234. Radially outer portion 232 may be connected between the radially outer portion 202 of the support member 200 and the forward hanger arm 162. For example, one or more bore holes 236 may be defined in the radially outer portion 232. A bore hole 236 may, when assembled, align with neighboring bore holes 163, 203, and a mechanical fastener 210 may extend through bore hole 236 as well as bore holes 163, 203 to connect the radially outer portion 232 to and between the radially outer portion 202 and the forward hanger arm 162.

The radially inner portion 234 of hanger plate 230 may be disposed within gap 220. In particular, the radially inner portion 234 may be positioned such that a secondary gap 222 is defined between the radially inner portion 234 of the hanger plate 230 and the radially inner portion 204 of the support member 200. Accordingly, contact between the radially inner portion 204 and radially inner portion 234 is prevented. Additionally, in some embodiments, one or more pockets 238 may be defined in the radially inner portion 204. Pockets 238 may face shroud 102, and may for example accommodate therein pins 140 as illustrated. Radially inner portion 234 may thus serve to generally protect pins 140 and shrouds 102 (and forward flanges 120 in particular) from contact with nozzle assembly 250 or support member 200 and resulting load transmission during engine 10 operation.

Referring briefly again to FIGS. 3 through 7, in some embodiments, support member 200 may additionally include a protrusion 240 which extends axially from the forward surface 206, such as between the radially outer portion 202 and the radially inner portion 204. The protrusion 240 may, when assembled, contact a seal 260 (which in exemplary embodiments as shown may be a leaf seal) of nozzle assembly 250. This interaction may further facilitate load transmission through support member 200 to hanger 104, while load transmission to shroud 102 is advantageously reduced or eliminated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine, the shroud assembly comprising:
    a hanger, the hanger comprising a forward hanger arm, a rear hanger arm axially spaced from the forward hanger arm, and a hanger body extending between the forward hanger arm and the rear hanger arm;
    a shroud, the shroud comprising a forward surface, a rear surface axially spaced from the forward surface, an inner surface extending between the forward surface and the rear surface, and an outer surface extending between the forward surface and the rear surface and radially spaced from the inner surface, the shroud connected to the hanger;
    a support member positioned axially forward of the forward hanger arm, the support member comprising a radially outer portion connected to the forward hanger arm and a radially inner portion axially spaced from the shroud such that a gap is defined between the radially inner portion and an axially adjacent surface of the shroud; and
    a hanger plate disposed between and in contact with the radially outer portion and the forward hanger arm.

2. The shroud assembly of claim 1, wherein the radially outer portion contacts the forward hanger arm.

3. The shroud assembly of claim 1, wherein the hanger plate comprises a radially outer portion connected between the radially outer portion of the support member and the forward hanger arm and a radially inner portion disposed in the gap, and wherein a secondary gap is defined between the radially inner portion of the support member and the radially inner portion of the hanger plate.

4. The shroud assembly of claim 1, wherein the support member further comprises a forward surface and an aft surface axially spaced from the forward surface, and wherein the support member further comprises a protrusion extending axially from the forward surface between the radially outer portion and radially inner portion.

5. The shroud assembly of claim 1, wherein the hanger further comprises a forward flange and a rear flange each extending from the hanger body, and wherein the shroud further comprises a forward flange and a rear flange each extending from the outer surface of the shroud body, the rear flange of the shroud axially spaced from the forward flange of the shroud, and wherein the forward flange and rear flange of the shroud are connected to the forward flange and the rear flange of the hanger to connect the shroud to the hanger.

6. The shroud assembly of claim 1, wherein the shroud is formed from a ceramic matrix composite.

7. The shroud assembly of claim 1, wherein the hanger is formed from a metal.

8. A shroud assembly for a gas turbine engine, the shroud assembly comprising:
    a hanger, the hanger comprising a forward hanger arm, a rear hanger arm axially spaced from the forward hanger arm, and a hanger body extending between the forward hanger arm and the rear hanger arm;
    a shroud, the shroud comprising a forward surface, a rear surface axially spaced from the forward surface, an inner surface extending between the forward surface and the rear surface, and an outer surface extending between the forward surface and the rear surface and radially spaced from the inner surface, the shroud connected to the hanger;
    a support member positioned axially forward of the forward hanger arm, the support member comprising a radially outer portion connected to the forward hanger arm and a radially inner portion axially spaced from the shroud such that a gap is defined between the radially inner portion and an axially adjacent surface of the shroud; and
    a mechanical fastener connecting the radially outer portion and the forward hanger arm.

9. The shroud assembly of claim 8, wherein the mechanical fastener comprises a nut and a bolt.

10. A shroud assembly for a gas turbine engine, the shroud assembly comprising:
    a hanger, the hanger comprising a forward hanger arm, a rear hanger arm axially spaced from the forward hanger arm, and a hanger body extending between the forward hanger arm and the rear hanger arm;
    a shroud, the shroud comprising a forward surface, a rear surface axially spaced from the forward surface, an inner surface extending between the forward surface and the rear surface, and an outer surface extending between the forward surface and the rear surface and radially spaced from the inner surface, the shroud connected to the hanger; and
    a support member positioned axially forward of the forward hanger arm, the support member comprising a radially outer portion connected to the forward hanger arm and a radially inner portion axially spaced from the shroud such that a gap is defined between the radially inner portion and an axially adjacent surface of the shroud, wherein the support member is formed from a metal.

11. A turbine section of a gas turbine engine, comprising:
    a shroud assembly, the shroud assembly comprising:
    a hanger, the hanger comprising a forward hanger arm, a rear hanger arm axially spaced from the forward hanger arm, and a hanger body extending between the forward hanger arm and the rear hanger arm;
    a shroud, the shroud comprising a forward surface, a rear surface axially spaced from the forward surface, an inner surface extending between the forward surface and the rear surface, and an outer surface extending between the forward surface and the rear surface and radially spaced from the inner surface, the shroud connected to the hanger; and
    a support member positioned axially forward of the forward hanger arm, the support member comprising a radially outer portion connected to the forward hanger arm and a radially inner portion axially spaced from the shroud such that a gap is defined between the radially inner portion and an axially adjacent surface of the shroud, wherein the support member further comprises a forward surface and an aft surface axially spaced from the forward surface, and wherein the support member further comprises a protrusion extending axially from the forward surface between the radially outer portion and radially inner portion; and a nozzle assembly positioned axially forward of the shroud assembly, the nozzle assembly comprising:

an airfoil; and an outer band positioned radially outward of the airfoil, the outer band comprising a rear surface, the rear surface in contact with the radially inner portion of the support member of the shroud assembly.

12. The turbine section of claim 11, wherein the radially outer portion contacts the forward hanger arm.

13. The turbine section of claim 11, further comprising a hanger plate disposed between and in contact with the radially outer portion and the forward hanger arm.

14. The turbine section of claim 11, further comprising a mechanical fastener connecting the radially outer portion and the forward hanger arm.

15. The turbine section of claim 11, wherein the shroud is formed from a ceramic matrix composite.

16. The turbine section of claim 11, wherein the hanger is formed from a metal.

17. The turbine section of claim 11, wherein the support member is formed from a metal.

18. A gas turbine engine, comprising:

a compressor section;

a combustion section;

a turbine section; and a shroud assembly disposed in one of the compressor or the turbine, the shroud assembly comprising:

a hanger, the hanger comprising a forward hanger arm, a rear hanger arm axially spaced from the forward hanger arm, and a hanger body extending between the forward hanger arm and the rear hanger arm;

a shroud, the shroud comprising a forward surface, a rear surface axially spaced from the forward surface, an inner surface extending between the forward surface and the rear surface, and an outer surface extending between the forward surface and the rear surface and radially spaced from the inner surface, the shroud connected to the hanger;

a support member positioned axially forward of the forward hanger arm, the support member comprising a radially outer portion connected to the forward hanger arm and a radially inner portion axially spaced from the shroud such that a gap is defined between the radially inner portion and an axially adjacent surface of the shroud; and a hanger plate disposed between and in contact with the radially outer portion and the forward hanger arm.

* * * * *